(12) United States Patent
Pohl

(10) Patent No.: US 6,420,843 B1
(45) Date of Patent: Jul. 16, 2002

(54) CONTROL DEVICE FOR AN ELECTRIC MOTOR FOR DISPLACEABLE MOTOR VEHICLE PART

(75) Inventor: Peter Pohl, Pentenried (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/631,991

(22) Filed: Aug. 3, 2000

(30) Foreign Application Priority Data

Aug. 6, 1999 (DE) .......................................... 199 37 222

(51) Int. Cl.⁷ ................................................. H02P 1/00
(52) U.S. Cl. ........................ 318/266; 475/162; 74/89.14
(58) Field of Search ................................ 318/468, 128, 318/266, 286, 369; 74/89.14, 606 R; 192/139; 296/223; 475/162, 176, 177

(56) References Cited

U.S. PATENT DOCUMENTS

| 4,272,125 A | * | 6/1981 | Bienert et al. ............... 296/223 |
| 4,420,185 A | * | 12/1983 | Bienert et al. ............... 296/223 |
| 5,181,891 A | * | 1/1993 | Pohl et al. ................... 296/223 |
| 5,768,942 A | * | 6/1998 | Gruber et al. ................ 296/223 |
| 6,073,504 A | * | 6/2000 | Gleixner et al. ............. 296/223 |

FOREIGN PATENT DOCUMENTS

| DE | 38 29 405 | 3/1990 |
| DE | 40 38 284 | 6/1992 |
| DE | 42 09 652 | 4/1993 |

* cited by examiner

Primary Examiner—Khanh Dang
(74) Attorney, Agent, or Firm—Nixon Peabody LLP; David S. Safran

(57) ABSTRACT

A control device for an electric motor which drives a motor vehicle part which is displaceable between reference positions, which is provided with a switch unit (12) for controlling the motor, there being a ratchet wheel (14) which, when the motor vehicle part is displaced, is forced to rotate less than 360 degrees between its end positions via an eccentric gearing (10) and actuates the switch unit depending on the rotational position of the ratchet wheel, the eccentric gearing having an externally toothed internal wheel and an internally toothed external wheel (24) which is interdigitally engaged to it, the ratchet wheel being supported for wobble motion with reference to a motor-driven shaft (18) which coupled to move with the motion of the displaceable motor vehicle part and which is pivotally mounted in a gearing housing (26), the ratchet wheel forming either the internal wheel or the external wheel of the eccentric gearing, the ratchet wheel and the switch unit being located within the gearing housing. The ratchet wheel (14) and the switch unit (12) are made for contactless actuation of the switch unit.

15 Claims, 1 Drawing Sheet

CONTROL DEVICE FOR AN ELECTRIC MOTOR FOR DISPLACEABLE MOTOR VEHICLE PART

BACKGROUND OF THE INVENTION

1. Field of the Invention

This invention relates to a control device for an electric motor for a displaceable motor vehicle part, with a switch unit for controlling the motor, a ratchet wheel which, when the motor vehicle part is displaced, is forced to rotate less than 360 degrees between its end positions via an eccentric gearing and actuates the switch unit depending on the rotary position of the ratchet wheel, the eccentric gearing having an externally toothed internal wheel and an internally toothed external wheel which is interdigitally engaged to it, the ratchet wheel being supported for wobble motion with reference to a motor-driven shaft is coupled to move with movement the displaceable motor vehicle part and which is pivotally mounted in a gearing housing, the ratchet wheel forming either the internal wheel or the external wheel of the eccentric gearing, and the external wheel, the ratchet wheel and the switch unit being located within the gearing housing, and the displaceable motor vehicle part preferably being a cover or a corresponding component of an openable motor vehicle roof.

2. Description of Related Art

A control device of the general type to which the invention is directed is known from German Patent DE 42 09 652 C1, the shaft being joined to rotate with rotation of a worm wheel which is driven by a worm shaft and which is provided with an eccentric recess in which a ratchet wheel is pivotally mounted with respect to the worm wheel, and thus, relative to the shaft. The ratchet wheel forms the internally toothed external wheel of the eccentric gearing. The externally toothed internal wheel of the eccentric gearing is formed on the housing cover. The switch unit is made as a switch with an actuating plunger which adjoins the outside periphery of the ratchet wheel in order to actuate the switch depending on the rotary position of the ratchet wheel. The outside periphery of the ratchet wheel is thus made essentially undulatory in order to compensate for the wobbling of the ratchet wheel. In a certain angular range, the outside periphery is provided with a trip cam in order to actuate the switch of the switch unit by means of the actuating plunger.

The disadvantage in this known control device is that the device requires a relatively large amount of space in the radial direction due to the switch which is provided on the outside periphery of the ratchet wheel and thus cannot be built to be especially compact.

Published German Patent Application DE 40 38 284 A1 discloses a control device for a window opener in which a disk which is to rotate with the drive motor of the window opener is magnetically coded so that its rotary position can be acquired by a Hall element. Instead of the Hall element, an optoelectronic, capacitive, inductive or ohmic scanning element can be used.

German Patent DE 38 29 405 C2 discloses a drive device for a sliding roof in which a gear wheel is provided with a magnetic ring which is driven by single-tooth gearing which for its part is driven by a shaft which is driven by the motor. The magnetic ring comprises two segments which are magnetized on opposite poles and is scanned by a magnetic sensor in order to acquire the position of the sliding cover which is driven by the motor-driven shaft.

SUMMARY OF THE INVENTION

The primary object of this invention is to devise a control device for an electric motor for a displaceable motor vehicle part which is built as compactly and simply as possible.

This object is achieved as in accordance with the invention by a control device in which a ratchet wheel and a switch unit are made for contactless actuation of the switch unit.

In this approach according to the invention it is advantageous that the control device, on the one hand, makes do with as few parts as possible, and on the other hand, the required construction space can be kept small.

In another advantageous embodiment, the external wheel is made on the gearing housing and the internal wheel is formed by the ratchet wheel. This facilitates a compact and stable construction.

Preferably, the ratchet wheel and the switch unit are made for inductive actuation of the switch unit, the ratchet wheel preferably having a magnetization which changes in the peripheral direction and the switch unit having a Hall sensor which detects the magnetization of the ratchet wheel.

Preferably, the switch unit comprises control electronics implemented on a board which carries the Hall sensor as well and which lies essentially parallel to the ratchet wheel. This enables especially compact execution of the control device.

In one preferred embodiment, the shaft has an eccentric section with respect to which the ratchet wheel can be turned. The shaft is preferably driven via a step-down gearing which is formed by a worm shaft which is connected to the motor, and a worm wheel which interdigitally engages it and sits securely on the shaft. Here, the eccentric section is made preferably in one piece with the worm wheel, and the eccentric section can be injection molded onto the worm wheel. In this way, the number of required mechanical parts can be minimized.

Preferably, the external wheel is made on the inside of a cover section of the gearing housing.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
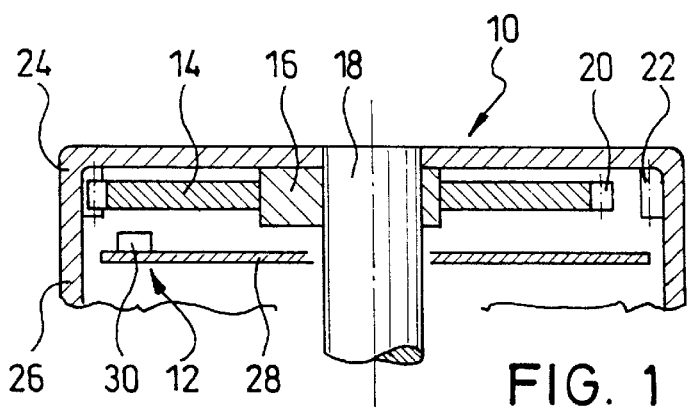
FIG. 1 is a sectional view of the eccentric gearing of a control device in accordance with the invention.

FIG. 1 shows a sectional view of an eccentric gearing 10, i.e, the eccentric gearing of a control device for an electric motor (not shown) which drives a motor vehicle part (not shown) which is displaceable between reference positions, and a switch unit 12 for controlling the motor. The displaceable motor vehicle part is preferably the cover of a sliding roof, a sliding and lifting roof, or a spoiler roof, or a fixed roof element of a folding roof or louvered roof which can be moved in the lengthwise direction of the roof.

The switch unit 12 is used to absolutely acquire the position of the displaceable motor vehicle roof. Since the motor shaft or the drive shaft driven by the engine shaft for the displaceable motor vehicle part generally turns by more than 360° when traversing the displacement range, the acquisition of the angular position of such an element does not lead to unequivocal assignment with respect to the position of the displaceable motor vehicle part. There is eccentric gearing 10 to provide a rotating element which turns less than 360° over the entire displacement range of the displaceable motor vehicle part. The element which turns less than 360° is a ratchet wheel 14 which is pivotally mounted on an eccentric section 16 of a driven shaft 18 which is pivotally supported in a cover section 24 of a gearing housing 26 and which is driven by the motor. The ratchet wheel 14 is provided with an external toothing 20 which fits into an internal toothing 22. The internal toothing 22 is made on the inside of the cover section 24 of the gearing housing 26. This cover section 24 with the internal toothing 22 forms the internally toothed external wheel of the eccentric gearing 10, while the ratchet wheel 14 forms the externally toothed internal wheel of the eccentric gearing 10, the ratchet wheel 14 running peripherally in the external wheel 24 by the turning of the the eccentric section 16 of the shaft 18 and in doing so executing wobbling motion.

The motion of the driven shaft 18 is securely linked to the position of the displaceable motor vehicle part which is driven, for example, by a ratchet which sits on the driven shaft 18 so as to rotate with it and which engages drive cables. The driven shaft 18 is driven preferably via step-down gearing which is formed by a worm shaft which is joined to the motor shaft so as to rotate with it and a worm wheel which interdigitally engages it and which sits securely on the shaft. The eccentric section 16 is made preferably in one piece with the worm wheel, and the eccentric section can be injection molded onto the worm wheel.

The external wheel 24 and 22, the ratchet wheel 14 and the switch unit 12 are located within the gearing housing 26 to prevent fouling.

The switch unit 12 is formed by a board 28 which is mounted on the housing, which runs parallel to the ratchet wheel 14 and which bears control electronics which are not shown in detail, a Hall sensor 30 which is securely mounted on the board 28, and the ratchet wheel 14 which is made as a magnetic wheel. The ratchet wheel 14 is made with a magnetization which changes in the peripheral direction so that the Hall sensor 30 can inductively acquire the rotary position of the ratchet wheel 14 without contact.

In addition to the switch unit 12, there is another means for determining the position of the displaceable motor vehicle part which is not shown here and which can comprise a magnetic wheel which is joined to rotate with the driven shaft 18 or the motor shaft, with a rotary position which is acquired by the inductive sensors. From the acquired pulse signals, the position of the displaceable motor vehicle part is determined by means of a counter from the number of rpm and the current angular position. However, since counter errors can occur in doing so, the switch unit 12 is provided to serve as an absolute calibration or monitoring of an additional counter.

Figure 2:
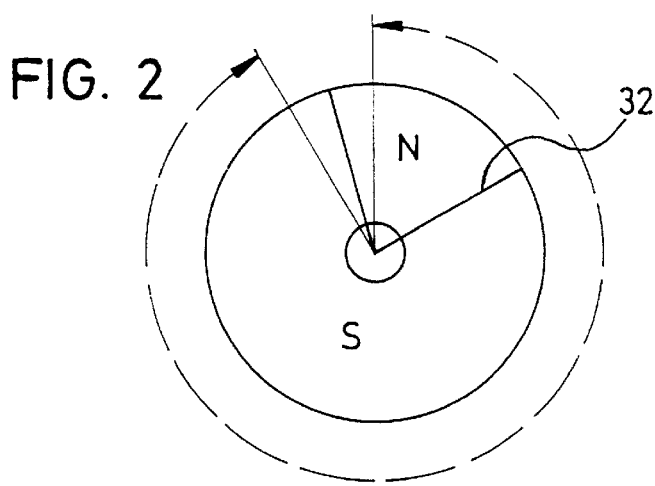
FIG. 2 shows a first embodiment of the rachet wheel from FIG. 1.
Figure 3:
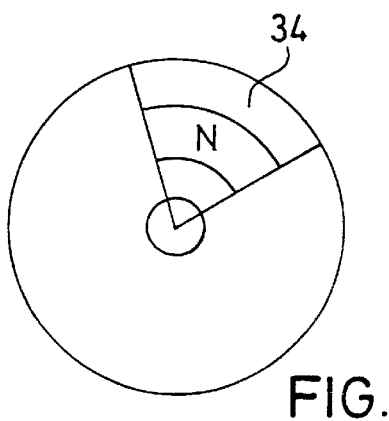
FIG. 3 shows a second embodiment of the ratchet wheel from FIG. 1.
Figure 4:
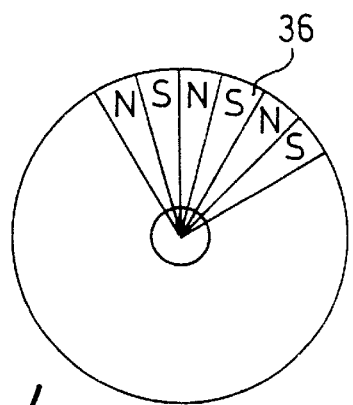
FIG. 4 shows a third embodiment of the ratchet wheel from FIG. 1.

FIGS. 2 to 4 show different embodiments for the ratchet wheel 14.

According to the embodiment from FIG. 2, the ratchet wheel has magnetic material essentially over its entire surface, there being two sectors which are each uniformly N or S polarized. In FIG. 2, the broken lines show the angular range over which the ratchet wheel turns during displacement of the displaceable motor vehicle part over the entire adjustment range. When the Hall sensor 30 acquires the change in magnetization on the magnetization boundary 32, the control electronics recognizes that the displaceable motor vehicle part is, for example, still five full revolutions of the driven shaft 18 and thus of the additional ratchet wheel, away from the closed position, by which current counting of the additional revolutions of the ratchet wheel can be checked, and if necessary, corrected. This principle also applies in the other embodiments of the invention.

In the embodiment which is shown in FIG. 3, the ratchet wheel is made mostly of plastic and has magnetic material only in the sector 34, which material is uniformly polarized. Here also, the Hall sensor 30 acquires changing magnetization on the boundaries of the magnetic sector 34 in the peripheral direction. The sector 34 is made only as a circular segment in order to save magnetic material. Also in the embodiment as shown in FIG. 2, the magnetic material be limited in the radial direction to an area which is determined by the position of the Hall sensor 30 and the eccentricity of the wobbling of the ratchet wheel 14.

In the embodiment shown in FIG. 14, there is a magnetic sector 36 which, however, in contrast to the embodiments as shown in FIG. 2 and FIG. 3, is divided into subsectors with alternating polarity. In this way, multiple polarization changes can be acquired; this enables acquisition of path pulses so that when the traversed path of a motor vehicle part which is moved by the electric motor is measured, for example, 100 pulses corresponds to a traversed adjustment path of 75 mm.

This invention is not limited to use of inductive activation of the switch unit 12 as long as the switch unit and the ratchet wheel are made such that the switch unit can be actuated without contact. Thus, for example, optoelectronic actuation of the switch unit is also contemplated.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A control device for an electric motor which drives a motor vehicle part which is displaceable between reference positions, comprising:

a switch unit for controlling the motor, an eccentric gearing, a ratchet wheel which, when the motor vehicle part is displaced, is forced to rotate less than 360 degrees between its end positions via the eccentric gearing and actuates the switch unit depending on the rotary position of the ratchet wheel, wherein the eccentric gearing has an externally toothed internal wheel and an internally toothed external wheel which is interdigitally engaged to it, wherein the ratchet wheel is supported for wobble motion with reference to a motor-driven shaft which has a motion which is securely linked to the motion of the displaceable motor vehicle part and which is pivotally mounted in a gearing housing, the ratchet wheel forming either the internal wheel or the external wheel of the eccentric gearing, wherein the ratchet wheel and the switch unit are located within the gearing housing, the ratchet wheel and the switch unit contactlessly interact for actuation of the switch unit and the external wheel is on the gearing housing and the internal wheel is formed by the ratchet wheel.

2. The control device as claimed in claim 1, wherein the ratchet wheel and the switch unit inductively interact for actuation of the switch unit.

3. The control device as claimed in claim 2, wherein the inductive interaction is produced by the ratchet wheel having a magnetization which changes in a peripheral direction and the switch unit comprising a Hall sensor which detects the magnetization of the ratchet wheel.

4. The control device as claimed in claim 3, wherein the ratchet wheel is made of magnetic material over essentially its entire surface.

5. The control device as claimed in claim 4, wherein the ratchet wheel has two sectors, one of which is uniformly N polarized and the other of which is uniformly S polarized.

6. The control device as claimed in claim 3, wherein the ratchet wheel has magnetic material only in one sector.

7. The control device as claimed in claim 6, where the magnetic material in the sector is uniformly polarized.

8. The control device as claimed in claim 6, wherein the sector is divided into subsectors of alternating polarity.

9. The control device as claimed in claim 3, wherein there is magnetic material in the ratchet wheel in only one area in a radial direction which is detectable by the Hall sensor position.

10. The control device as claimed in claim 3, wherein the switch unit comprises control electronics implemented on a board which also bears the Hall sensor and which lies essentially parallel to the ratchet wheel.

11. The control device as claimed in claim 1, wherein the shaft has an eccentric section with reference to which the ratchet wheel is pivotally mounted.

12. The control device as claimed in claim 11, further comprising a step-down gearing formed by a worm shaft which is connected to the motor and a worm wheel which interdigitally engages the worm shaft and which sits securely on the shaft; wherein the shaft is in driven connection to the step-down gearing.

13. The control device as claimed in claim 12, wherein the eccentric section is made in one piece of the worm wheel.

14. The control device as claimed in claim 13, wherein the eccentric section is injection molded onto the worm wheel.

15. The control device as claimed in claim 1, wherein the external wheel is made on the inside of a cover section of the gearing housing.

* * * * *